(12) United States Patent
Saitoh et al.

(10) Patent No.: US 7,242,973 B2
(45) Date of Patent: Jul. 10, 2007

(54) PORTABLE ELECTRONIC DEVICE

(75) Inventors: Eiji Saitoh, Yokohama (JP); Tsuyoshi Kobayashi, Yokohama (JP); Tadayuki Takanashi, Yokohama (JP); Kanta Jyuudai, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/530,925

(22) PCT Filed: Oct. 11, 2002

(86) PCT No.: PCT/JP02/10616

§ 371 (c)(1),
(2), (4) Date: Apr. 8, 2005

(87) PCT Pub. No.: WO2004/034488

PCT Pub. Date: Apr. 22, 2004

(65) Prior Publication Data

US 2006/0079298 A1    Apr. 13, 2006

(51) Int. Cl.
*H04M 1/00* (2006.01)

(52) U.S. Cl. .............. 455/575.1; 455/550.1; 455/572; 455/573; 455/90.3; 379/428.01; 379/433.01; 379/433.08; D14/138; D14/140; D14/240

(58) Field of Classification Search ......... 455/575.1, 455/575.2, 575.3, 575.4, 575.5, 128, 550, 455/90.1, 90.2, 90.3, 550.1, 572, 573, 575.8, 455/347, 899; D14/138, 140, 240; 379/428.01, 379/433.01, 433.08, 434, 437, 440
See application file for complete search history.

(56) References Cited

U.S. PATENT DOCUMENTS 5,189,358 A * 2/1993 Tomura et al. ............ 320/115

(Continued)

FOREIGN PATENT DOCUMENTS

CN    1114845    5/1995

(Continued)

OTHER PUBLICATIONS

Microfilm of the specification and drawings annexed to the request of Japanese Utility Model Application NO. 101764/1987 (Laid-Open no. 007760-1988), Kenwood Corp., Jan. 17, 1989, p. 4, lines 3-5, line 16, figs. 1-3.

*Primary Examiner*—Joseph Feild
*Assistant Examiner*—Olumide Ajibade-Akonai
(74) *Attorney, Agent, or Firm*—Pearne & Gordon LLP

(57) ABSTRACT

An object of the invention is to smoothen the loading of a battery pack, to ensure the electric connection between the battery pack and the main body of a mobile electronic apparatus, and to reduce the manufacture cost. In the invention, a mobile electronic apparatus comprises collision avoiding mechanisms (4) including: generally sector-shaped ascent/descent portions (41A) and suitably shaped push-up portions (41B) disposed higher than and corresponding to connecting terminals (22) disposed in the battery chamber (22), on inner wall faces (21A/21B) formed on the two sides along the loading (α) direction of the battery pack (3) so as to form the battery chamber (21) and near the corner portions intersecting abutting wall faces (21C) perpendicular to the inner wall faces (21A/21B) for forming the battery chamber (21); and riding portions (42) formed on the back face of the battery pack (3) confronting the ascent/descent portions (41A) and the push-up portions (41B) on the two widthwise sides of the battery pack (3) and ascending/descending while sliding on the sector-shaped faces of the push-up portions (41B) thereby to ride over the connecting terminals (22) disposed in the battery chamber (21). When the battery pack (3) is loaded into the battery chamber (21), its riding portions (42) can ride on the ascent/descent portions (41) so that they can safely ride over the connecting terminals (22).

5 Claims, 10 Drawing Sheets

U.S. PATENT DOCUMENTS

| | | |
|---|---|---|
| 5,308,716 A | 5/1994 | Shababy et al. |
| 5,535,437 A * | 7/1996 | Karl et al. ............... 455/575.1 |
| 5,606,594 A * | 2/1997 | Register et al. .......... 455/556.2 |
| 5,933,330 A * | 8/1999 | Beutler et al. .............. 361/814 |
| 6,515,450 B1 * | 2/2003 | Kaiho et al. ................ 320/112 |
| 6,763,245 B1 * | 7/2004 | Satoh et al. ............. 455/550.1 |
| 6,829,495 B2 * | 12/2004 | Lee .......................... 455/575.1 |
| 6,917,824 B2 * | 7/2005 | Kobayashi ............... 455/575.3 |
| 2002/0160728 A1 * | 10/2002 | Morita ........................ 455/90 |

FOREIGN PATENT DOCUMENTS

| | | |
|---|---|---|
| FR | 2 712 435 | 5/1995 |
| GB | 2 287 576 | 9/1995 |
| JP | 64-42199 A | 2/1989 |
| JP | 8-504054 | 4/1996 |
| JP | 9-69360 | 3/1997 |
| JP | 11-354090 | 12/1999 |
| JP | 2000-269655 | 9/2000 |
| JP | 2002-124230 | 4/2002 |
| JP | 2002141994 A * | 5/2002 |
| WO | 95/08849 | 3/1995 |

\* cited by examiner

US 7,242,973 B2

PORTABLE ELECTRONIC DEVICE

TECHNICAL FIELD

The present invention relates to a mobile electronic apparatus having a removable battery pack and, more particularly, to a mobile electronic apparatus which can realize a smooth loading of the battery pack.

BACKGROUND ART

A mobile telephone generally used a removable battery pack for its power source. This battery pack is usually formed into a thin plate shape so that it is loaded into a battery chamber formed in the lower portion of the back of the body casing of the mobile telephone.

A conventional mobile telephone such as a rod-shaped (or straight type) mobile telephone and its battery pack are specifically described with reference to FIG. 17.

As shown, a casing 101 on the side of a body 100 of the mobile telephone is formed generally into a box shape. In the back side of the casing 101, there is formed a battery chamber 102, which is provided on its floor face side with a plurality of spring terminals 103. These spring terminals 103 are disposed in the widthwise (X) direction for electric contact to a later-described battery pack 200.

On the other hand, the battery pack 200 has a body portion 201 formed into a thin box- or plate-shape, and is provided back electrodes 202 at the portion corresponding to the disposed position of the sprint terminals 103 of the battery chamber 102, i.e., at the upper end portion of the back face portion.

Moreover, the battery pack 200 is provided in the battery chamber 102 with a pair of left and right push-up projections 104 for preventing the back side of the battery pack 200 from coming into forcible contact with the spring terminals 103 in the battery chamber 102 when the battery pack 200 is loaded into the battery chamber 102. At the same time, the battery pack 200 is provided, on the two sides of one end portion (or the leading end side) on its back, with riding projections 203 for engaging with those push-up projections 104.

When the battery pack 200 is to be loaded into the battery chamber 102, therefore, the riding projections 203 on the battery pack 200 ride over the push-up projections 104 on the side of the battery chamber 102, thereby to prevent the back of the battery pack 200 from contacting with the spring terminals 103 on the side of the battery chamber 102.

Usually, however, the push-up projections 104 on the side of the battery chamber 102 and the riding projections 203 on the side of the battery pack 200 are formed generally into a square pole shape. The battery pack 200 performs such a riding action that its leading end portion having the riding projections 203 are once pushed up generally in the upward (Z) direction by the push-up projections 104 and then abruptly fall down just after they passed the spring terminals 103.

Thus, according to the mobile telephone thus constructed, the battery pack 200 makes such straight motions, in which it abruptly falls down at a substantially right angle of about 90 degrees to the floor face of the battery chamber 102 so that the loading action of the battery pack 200 cannot be kept away from any rattling.

In this mobile telephone, moreover, the battery pack 200 is loaded while its back sliding on the spring terminals 103, even if the back of the battery pack 200 does not forcibly collide against the spring terminals 103 of the battery chamber 102. As a result, the crests of the metallic spring terminals 103 scrape the back of the battery chamber 102 made of a synthetic resin, bit by bit. The contact/conduction with the back electrodes 203 of the battery pack 200 may fail.

In view of the background thus far described, the invention has an object to provide a mobile electronic apparatus, which can smoothen the loading of a battery pack and ensure the electric connection between the battery pack and the body of a mobile electronic apparatus.

DISCLOSURE OF THE INVENTION

According to a first aspect of the invention, there is provided a mobile electronic apparatus including: a main body having a battery chamber recessed generally in a rectangular shape in a lower portion of a back side of a casing, as opposed to a surface side having an operation unit and a display unit; and a battery pack adapted to be removably contained in the battery chamber formed at a back face of the casing of the main body, the mobile electronic apparatus comprising:

a collision avoiding unit includes:
  generally sector-shaped ascent/descent portions and suitably shaped push-up portions which are disposed higher than and corresponding to a connecting terminal disposed in the battery chamber, on inner wall faces formed on the two sides along the loading direction of the battery pack so as to form the battery chamber and near a corner portion intersecting an abutting wall face perpendicular to the inner wall faces for forming the battery chamber; and
  riding portions which are formed on a back face of the battery pack confronting the ascent/descent portions and the push-up portions on the two widthwise sides of the battery pack and ascending/descending while sliding on the sector-shaped faces of the push-up portions so as to ride over the connecting terminal disposed in the battery chamber.

As a result, it is possible to smoothen the loading/unloading of the battery pack and to ensure the electric connection between the battery pack and the main body of the mobile electronic apparatus.

According to a second aspect of the invention, an area for a cleaning operation to clean outer face of the connecting terminal or a back electrode disposed in the battery pack is set between the ascent/descent portions of the casing on a main body side of the mobile electronic apparatus and the riding portions of the battery pack at the time when the battery pack is loaded into the mobile electronic apparatus.

As a result, at each loading/unloading time of the battery pack, the connecting terminals and the electrodes can be cleaned in association with the loading/unloading operation. As a result, the electric contact failure can be prevented even for a long-term use or under a dusty environment.

According to a third aspect of the invention, the mobile electronic apparatus is a mobile telephone having a rod-shaped the main body side casing. The collision avoiding unit is constructed that the ascent/descent portions disposed on the main body side casing of the mobile telephone are formed into generally concavely arcuate faces oriented toward the loading direction of the battery pack. The collision avoiding unit is constructed that the riding portions of the battery pack are formed into generally convexly arcuate faces oriented in the direction to unload the battery pack. The collision avoiding unit is constructed that a plurality of the connecting terminals are arranged along a shorter direction of the main body side casing, and a plural of the back electrodes are arranged on a back face of the battery pack so as to correspond to the connecting terminals for connecting to the connecting terminals of the battery chamber.

As a result, in the rod-shaped type mobile telephone, the collision avoiding mechanisms can be constructed of the simple structure thereby to lower the manufacturing cost.

According to a fourth aspect of the invention, the mobile electronic apparatus is a folding type mobile telephone having main body side casing portions connected to each other through a hinge. The collision avoiding unit is constructed that the ascent/descent portions disposed on the main body side lower casing of the mobile telephone are formed into generally convexly arcuate faces oriented toward the loading direction of the battery pack. The collision avoiding unit is constructed that the riding portions of the battery pack are formed into generally concavely arcuate faces oriented in the direction to unload the battery pack. The collision avoiding unit is constructed that a plurality of the connecting terminals are arranged along the longer direction of the main body side casing, and a plurality of the back electrodes are arranged on a back face of the battery pack so as to correspond to the connecting terminals for connecting to the connecting terminals of the battery chamber.

As a result, in the folding type mobile telephone, the collision avoiding mechanisms can be constructed of the simple structure thereby to lower the manufacturing cost.

According to a fifth aspect of the invention, a plurality of the connecting terminals in the battery chamber are made of pin terminals protruded vertically upward from a floor face of the battery chamber, and are biased with an elastic force to freely move in a vertically upward direction.

As a result, the battery pack is loaded while drawing a round trajectory so that it can be highly precisely loaded to reduce the size of the electrodes to contact/conduct with the pin terminals.

Figure 1:
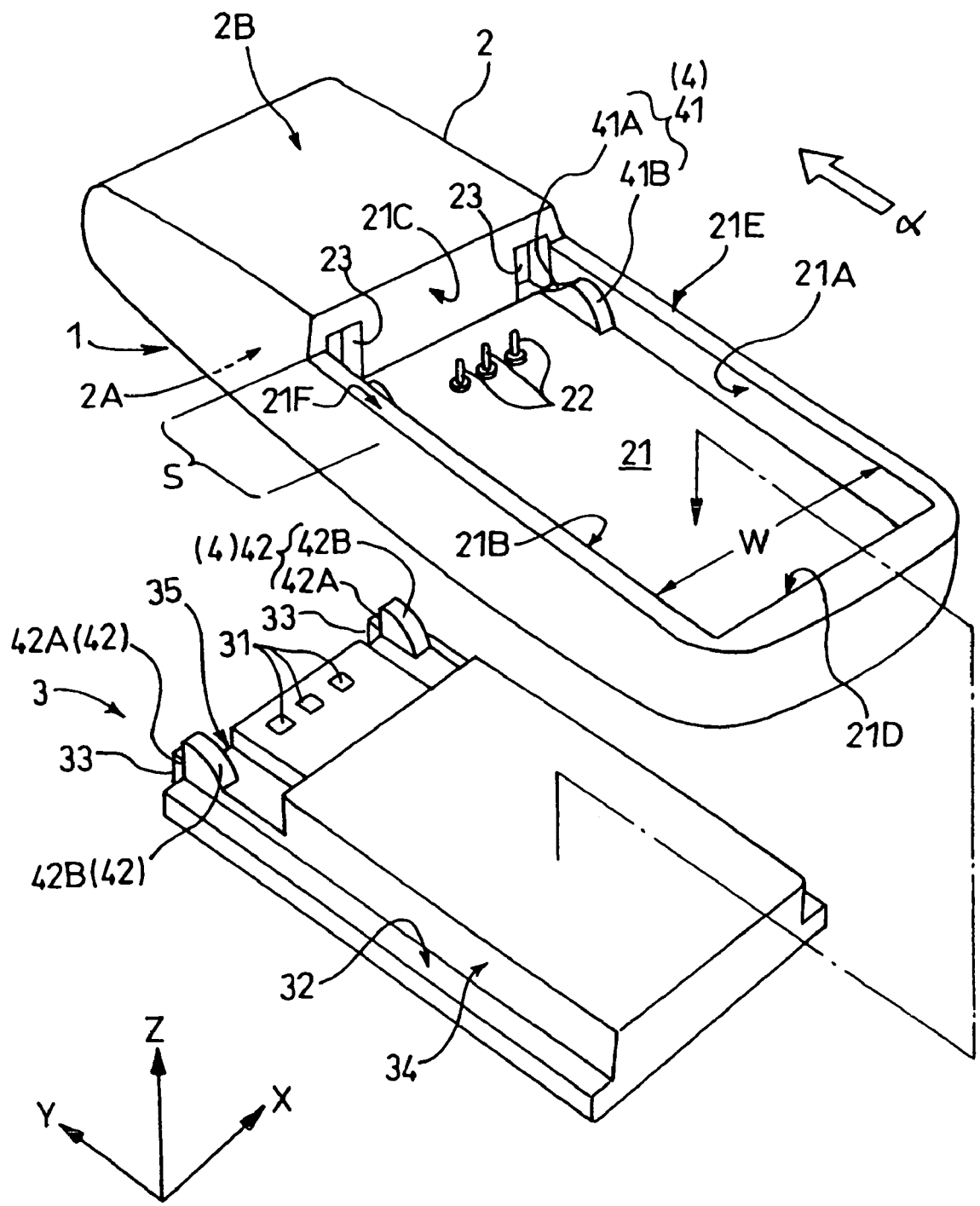
FIG. 1 is a schematic perspective view showing the body of a mobile telephone and a battery pack according to a first embodiment of the invention.

In the reference characters in the Drawings: 1 designates a body; 2 a casing; 2A a surface; 2B a back; 21 a battery chamber; 21A and 21B side wall faces; 21C a partition face (an abutting wall face); 21D a wall face; 21E and 21F slide faces; 22 pin terminals; 23 locking holes; 3 a battery pack; 31 back electrodes; 32 receiving portions; 33 locking pawls; 34 side walls; 35 a leading end face; 4 collision avoiding mechanisms; 41 ascent/descent push-up portion; 41A concavely curved faces; 42 riding portions; 42A depending faces; 42B convexly curved faces: 5 a lower casing; 5A a surface; 5B a back face; 51 a battery chamber; 51A and 51B side wall faces; 51C a partition face; 51E and 51F push-up faces; 52 pin terminals; 53 locking holes; 6 a battery pack; 61 back electrodes; 62 received portions; 63 locking pawls; 64 side walls; 65 a leading end face; 7 collision avoiding mechanisms; 71 ascent/descent portions; 71A concavely curved faces; 72 riding portions; 72B convexly curved faces; α a loading direction of the battery pack; d a clearance (play); δ a cleaning area (a cleaning stroke); H a hinge; S a space; X a widthwise direction; and Y a lengthwise direction.

BEST MODE FOR CARRYING OUT THE INVENTION

Embodiments of the invention will be described in detail with reference to the accompanying drawings.

First Embodiment

FIG. 1 shows a mobile telephone according to a first embodiment of the invention. This mobile telephone used is of a rod-shaped type (or a straight type), and is provided as its major components with a body 1 and a battery pack 3 to be removably mounted in the body 1. These body 1 and battery pack 3 are equipped with collision avoiding mechanisms 4.

Of these components, the body 1 has a casing 2 formed into a generally thin box shape. Especially in the rod-shaped type mobile telephone, the casing 2 is formed into a generally slender shape, in which a longitudinal (Y) direction (as will be called the "longitudinal direction") perpendicular to a transverse (X) direction (as will be called the "widthwise direction") is several times as long as the transverse direction. The not-shown liquid crystal display (LCD) unit and the (not-shown) various operation keys are attached to the surface 2A. On the back 2B of the casing 2, on the other hand, there is formed a recessed battery chamber 21, in which the later-described battery pack 3 is removably mounted.

The battery chamber 21 is formed in the lower side of the back of the casing 2, i.e., over an about one half or more of the entire back. Especially in this rod-shaped type mobile telephone, the battery chamber 21 is also formed into such a long shape and a generally rectangular shape according to the long shape of the casing 2 that the lengthwise direction (or the longer direction) is several times as large as the widthwise direction (or the shorter direction). This battery chamber 21 is defined on its two left and right sides by lower and longer inner wall faces 21A and 21B (as will be called the "side wall faces") and on its two upper and lower sides perpendicular to the left and right sides by a shorter high inner wall face 21C (which forms an abutment wall face of the invention, as will be called the "partition face") and a shorter low wall face 21D. In that partition face 21C, there are formed the later-described locking holes 23 on the two left and right sides.

Moreover, the battery chamber 21 is provided at the individual side wall faces 21A and 21B with left and right slender frame faces 21E and 21F (as will be called the "slide faces"), which are disposed in parallel while holding a spacing W. The later-described received portions 32 of the battery pack 3 slide and move on the frame faces 21E and 21F.

In this battery chamber 21, moreover, pin terminals 22 for electric contact to the battery pack 3 are disposed in the floor face side of the casing 2.

A plurality of (e.g., ordinary three) pin terminals 22 are arranged in series. In this rod-shaped type mobile telephone, the lengthwise (Y) direction of the casing 2 is the longer direction, as described hereinbefore. The battery chamber 21 has a relatively sufficient space in the longer direction. By making use of the sufficient space S in this longer direction, therefore, the pin terminals 22 are arranged in parallel with the widthwise (or shorter) direction perpendicular to the lengthwise (or longer) direction.

In FIG. 1, on the other hand, the not-shown major electronic parts of the mobile telephone are disposed in the casing 2 of the body 1 of the mobile telephone and exclusively on the upper side avoiding the lower side, in which the battery chamber 21 is located. The pin terminals 22 are disposed close to the upper portion of the battery chamber 21 close to the upper portion of the casing 2 so that the voltage drop or the like at the time of power feed from the power source can be minimized.

Figure 2:
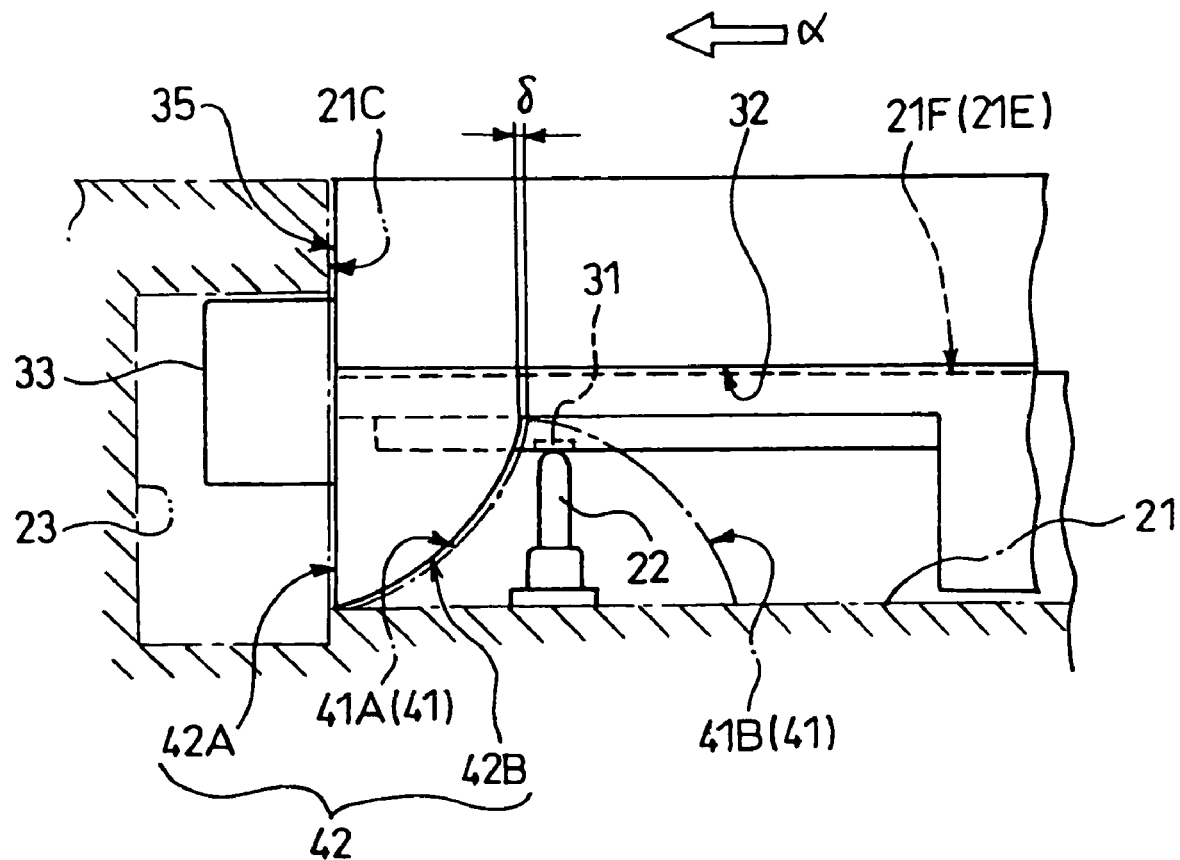
FIG. 2 is an explanatory view showing collision avoiding mechanisms, which are disposed at the body of the mobile telephone and the battery pack shown in FIG. 1.

Moreover, the battery chamber 21 has ascent/descent portion and a push-up portion (as will be called together the "ascent/descent push-up portions 41"), which construct a portion of the collision avoiding mechanism 4 and is protruded generally in a sector shape. These ascent/descent push-up portions 41 are disposed on the side wall faces 21A and 21B near the corner portions to cross the partition face 21C, as shown in FIG. 2. The ascent/descent push-up portion 41 has a curved face 41A (as will be called the "concavely curved face"), which is so recessed (in a smoothly arcuate shape) on the face confronting the partition face 21C as to form the ascent/descent portion. This concavely curved face 41A descends (or ascends) the leading end portion of the battery pack 3, when this battery pack 3 is loaded (or unloaded), smoothly in a mounting ($\alpha$) direction. The curvature (or the radius of curvature) is suitably determined according to the disposed position of the pin terminals 22, such as the distance from the partition face 21C or the height of the side wall faces 21A and 21B.

On the opposite face of the concavely curved face 41A, on the other hand, there is formed a curved face 41B (as will be called the "convexly curved face"), which is curved in a convex sector shape (or in a smoothly arcuate shape) to form the push-up portion. The convexly curved face 41B pushes up the later-described leading end portion of the battery pack 3, when this battery pack 3 is loaded, smoothly in accordance with the height of the pin terminals 22. Especially, the shape and curvature of the curved face 41B are not univocally determined but are sufficient so long as the battery pack 3 can be smoothly pushed up.

The battery pack 3 has a body portion formed into a thin box shape. Back electrodes 31 are disposed in the same number and arrangement on such one end portion (as will be called the "leading end portion") of the back of the battery pack 3 as corresponds to the disposed position of the pin terminals 22 of the battery chamber 21.

Moreover, this battery pack 3 has riding portions 42, which protrude generally in a sector shape to form a part of the collision avoiding mechanism 4. These riding portions 42 protrude from the two left and right sides of that leading end portion of the back of the battery pack 3, which confronts the ascent/descent push-up portions 41. The riding portions 42 smoothly ride on and over the ascent/descent push-up portions 41 while sliding on the sector-shaped concavely curved faces 41A of the ascent/descent push-up portions 41, thereby to avoid the battery pack 3 reliably from colliding against the pin terminals 22.

In these riding portions 42, the leading end faces 35 to confront the partition face 21C form flat faces 42A (as will be called the "depending faces") extending vertically downward from the body portion of the battery pack 3. On the other hand, the faces of the side opposed to the depending faces 42A are concavely curved (in a smooth arcuate shape) to form curved faces 42B (as will be called the "convexly curved faces"). The convexly curved faces 42B are given such a curvature (or a radius of curvature) substantially equal to that of the concavely curved faces 41A that they may substantially fit on the concavely curved faces 41A of the ascent/descent push-up portions 41 when the battery pack 6 is mounted, while finally retaining the later-described cleaning area $\delta$ (or the cleaning stroke) (as referred to FIG. 2).

Here, this cleaning area $\delta$ (or the cleaning stroke) is provided for cleaning and removing the dust or another insulator, which may stick to the back electrodes 31 of the battery pack 3 or the pin terminals 22 of the battery chamber 21 simultaneously as the battery pack 3 is loaded or unloaded. The back electrodes 31 of the battery pack 3 are allowed by that area to contact with/slide to the pin terminals 22 of the battery chamber 21.

Figure 3:
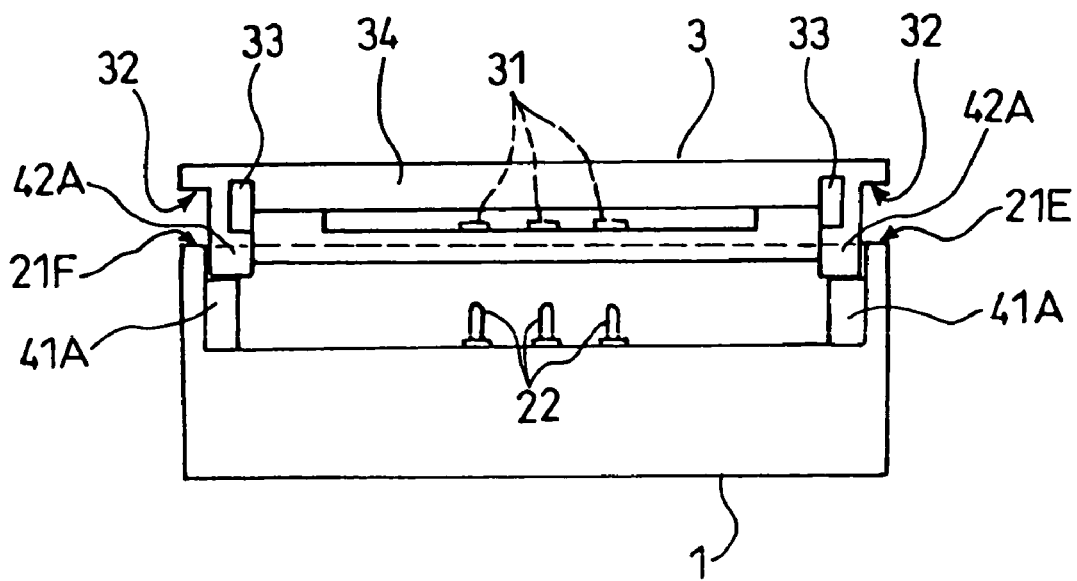
FIG. 3 is an explanatory view showing the state, in which the battery pack rides over pin terminals disposed at the body of the mobile telephone shown in FIG. 1.

As shown in FIG. 1 and FIG. 3, moreover, this battery pack 3 has the received portions 32 of a step shape, which perpendicularly intersect across the spacing W with the widthwise direction in the whole lengthwise direction on the two transverse side faces. These received portions 32 construct one guide unit at the time when they are loaded while sliding on the slide faces 21E and 21F of the battery chamber 21.

Here, the portion of the casing 2 of the body 1 of the mobile telephone and the battery pack 3 are provided with a lock mechanism for preventing the battery pack 3 from floating or coming out after the battery pack 3 was loaded into the battery chamber 21.

In this mobile telephone, specifically, the casing 2 of the body 1 has the locking holes 23 in the partition face 21C confronting the battery chamber 21, as shown in FIG. 2, and the battery pack 3 has protruding locking pawls 33 to engage with the locking holes 23, thereby to construct the lock mechanism. When the battery pack 3 is loaded into the battery chamber 21, subsequent to the riding action by the aforementioned collision avoiding mechanism 5, the locking action by the locking mechanism is continuously performed while the battery pack 3 is being slid along the floor face of the battery chamber 21. The locking action after the riding action is performed while the back electrodes 31 of the battery pack 3 are contacting with/sliding on the pin terminals 22 in the battery chamber 21. In other words, the locking action is performed together with the cleaning action.

According to this embodiment, therefore, the casing 2 on the side of the body 1 and the battery pack 3 are provided with the sector-shaped ascent/descent push-up portions 41 and the sector-shaped riding portions 42 as the collision avoiding mechanisms 4. The arcuately curved faces are made to engage with each other, and the loading/unloading operations are done while turning the battery pack 3. As a result, the battery pack 3 can be descended precisely in a pin point to the desired loading position.

Moreover, these highly precise loading/unloading actions can be realized to ensure the reliable conductions even if the battery chamber 21 is provided with not the conventional spring terminals but the pin terminals 22 as the connecting terminals. By providing these pin terminals 22, moreover, the connecting terminals can be small-sized and shortened. Especially in case the connecting terminals are made of gold (Au), the cost can be lowered.

Figure 17:
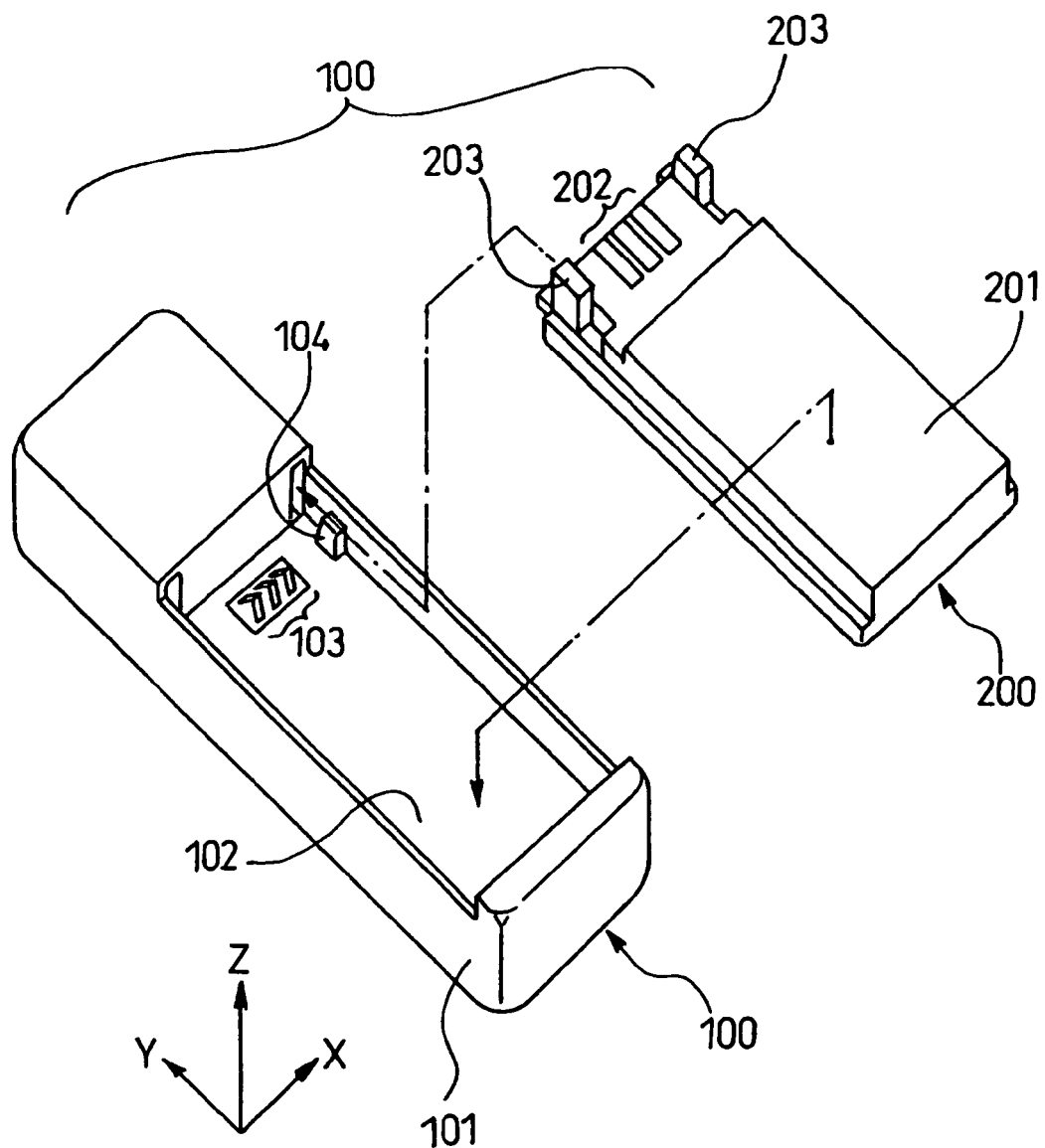
FIG. 17 is a schematic perspective view showing the body of a mobile telephone and a battery pack of the prior art.

Here in this embodiment, the pin terminals are provided as the connecting terminals, but the connecting terminals of the invention may be the spring terminals (as designated at 103 in FIG. 17) used in the prior art.

Specifically, the spring terminals are so shaped that the crests positioned at the central portions are folded and protruded generally in a v shape, and are given such spring properties that they can move vertically of the floor face of the battery chamber 21. The spring terminals absorb the fluctuations of their spacings from the back electrodes 31 of the battery pack 3 by moving them in the longitudinal (Y) direction (i.e., in the longer direction in the casing 2 of the body of the mobile telephone) with respect to the floor face.

The actions of the mobile telephone according to this embodiment are described with reference to FIG. 4 to FIG. 8.

Here is described the case, in which the battery pack 3 is loaded into the battery chamber 21 of the casing 2.

Figure 4:
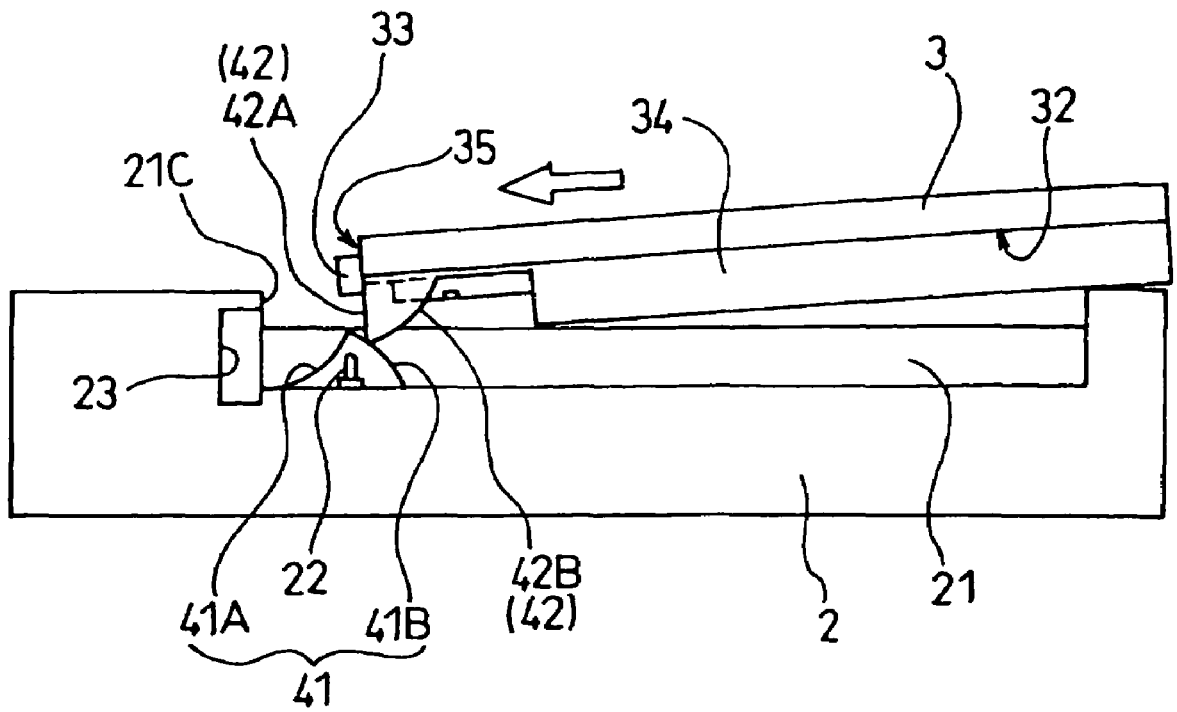
FIG. 4 is an explanatory view showing a first action at the time when the battery pack is loaded into the battery casing of the body of the mobile telephone according to the first embodiment of the invention.
Figure 5:
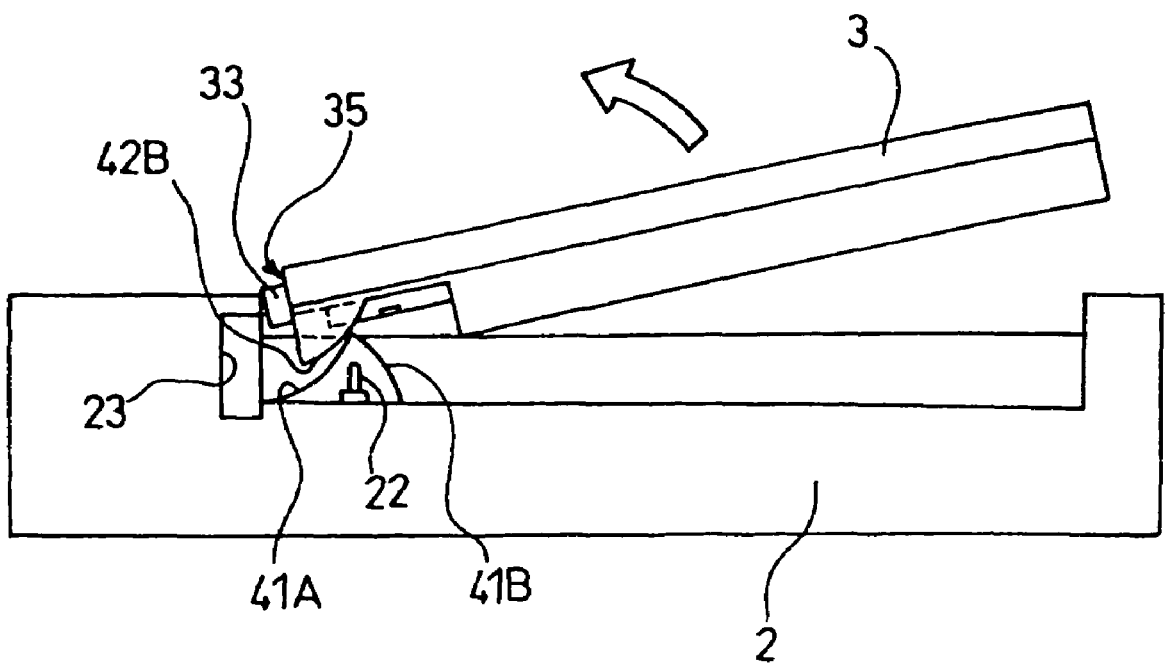
FIG. 5 is also an explanatory view showing a second action at the time when the battery pack is mounted in the battery chamber.

(1) In the casing 2 of the body 1 of the mobile telephone, as shown in FIG. 4, the battery pack 3 is moved in the direction of arrow from its root end portion (or its lower portion) (as located on the right end portion side in FIG. 4).

Specifically in FIG. 4, while the side walls 34 of the battery pack 3 between the received portions 32 on the two left and right sides are being clamped by the side wall faces 21A and 21B on the two left and right sides, the battery pack 3 is inserted into the battery chamber 21 and is slid leftward as it is in the inclined state, in which its leading end portion is lower.

As a result, the battery pack 3 is moved forward (i.e., the first action) toward the partition face 21C, while it is being guided with its side walls 34 being clamped between the side wall faces 21A and 21B and with its received portions 32 being borne by the slide faces 21E and 21F, till its leading end portion reaches the collision avoiding mechanisms 4.

(2) When the leading end portion of the battery pack 3 reaches the collision avoiding mechanisms 4, the depending faces 42A of the riding portions 42 are regained by the convexly curved faces 41B of the ascent/descent push-up portions 41, and then smoothly rise along the convexly curved faces 41B and pass the uppermost portions (corresponding to the disposed positions of the pin terminals 22) of the ascent/descent push-up portions 41. After this, the convexly curved faces 42B of the riding portions 42 smoothly move down along the concavely curved faces 41A. As a result, the leading end portion of the battery pack 3 can safely ride over without any collision against the pin terminals 22 (i.e., the second action).

Figure 6:
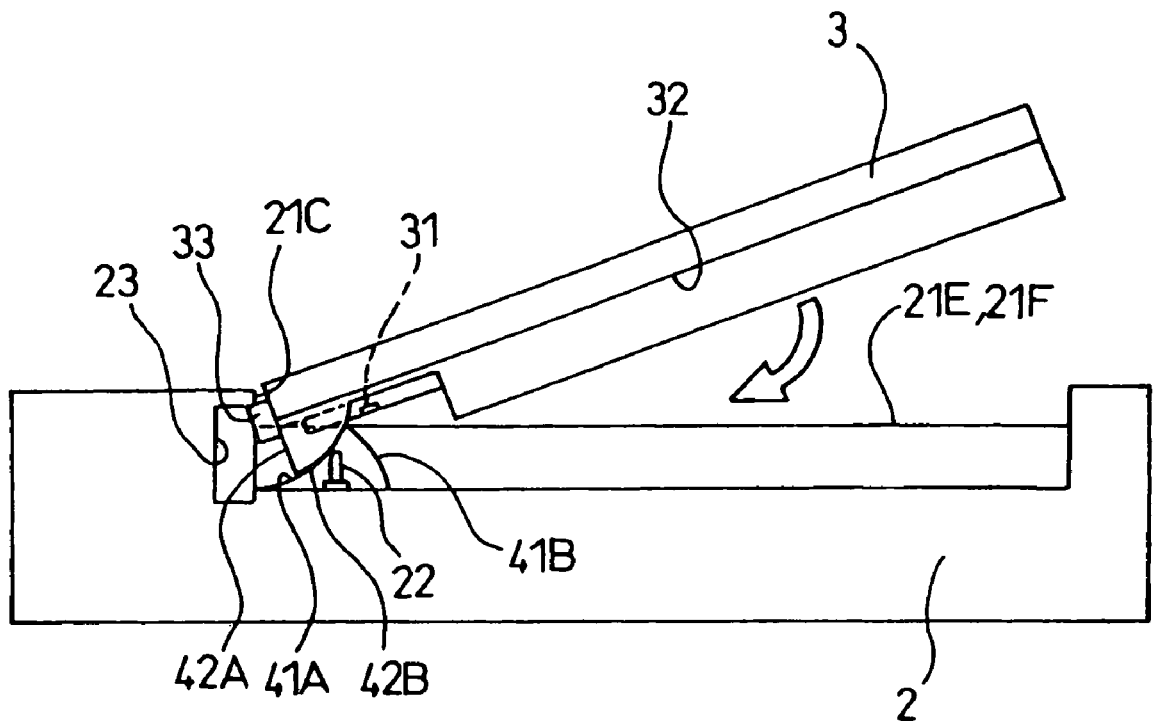
FIG. 6 is also an explanatory view showing a third action at the time when the battery pack is mounted in the battery chamber.

(3) Next, as shown in FIG. 6, the battery pack 3 smoothly moves down with its convexly curved faces 42B of the riding portions 42 following the concavely curved faces 41A, i.e., while drawing turning trajectories, so that the locking pawls 33 at its leading end portion begin to enter the locking holes 23 (i.e., the third action).

Figure 7:
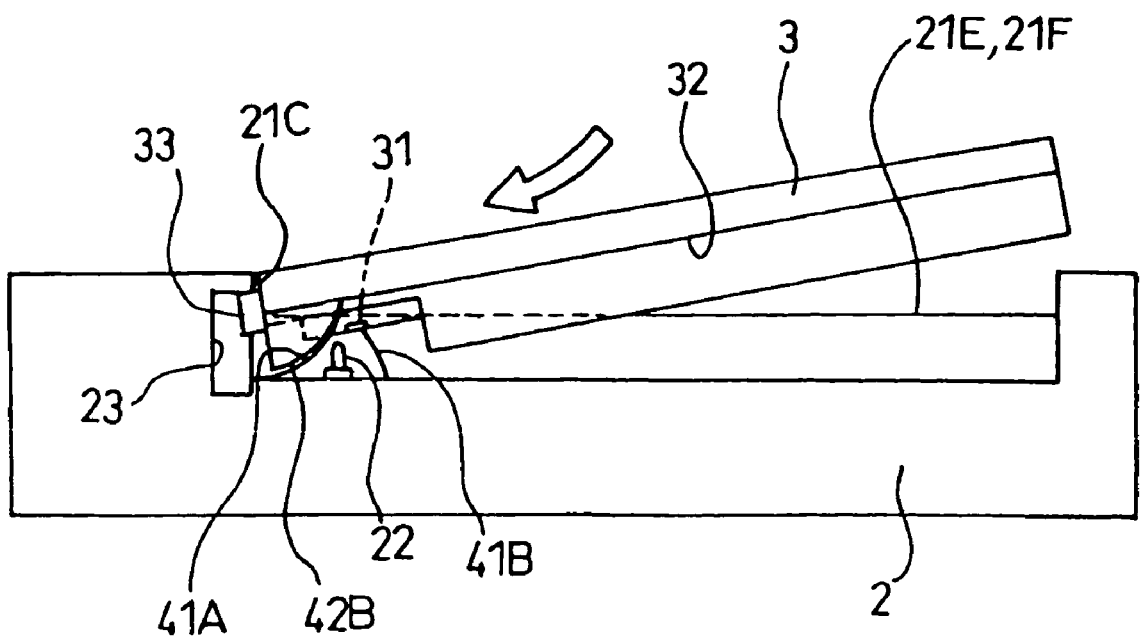
FIG. 7 is also an explanatory view showing a fourth action at the time when the battery pack is mounted in the battery chamber.

(4) As shown in FIG. 7, the battery pack 3 then descends with the convexly curved faces 42B of the riding portions 42 drawing the rotary trajectories along the concavely curved faces 41A, so that the locking pawls 33 go deeply into the locking holes 23 (i.e., the fourth action).

Figure 8:
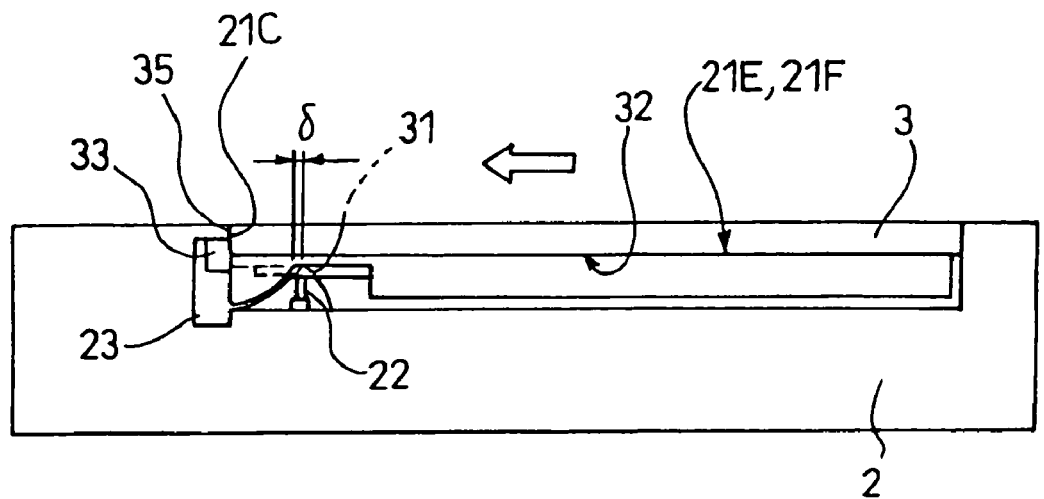
FIG. 8 is also an explanatory view showing a fifth action at the time when the battery pack is mounted in the battery chamber.

(5) When the convexly curved faces 42B of the riding portions 42 fully slide on the concavely curved faces 41A to the last (i.e., to the lowermost position), the received portions 32 of the battery pack 3 slide forward by a constant speed along the slide faces 21E and 21F, as shown in FIG. 8, thereby to perform the cleaning action. When the battery pack 3 moves forward by the cleaning area δ (or the cleaning stroke), its leading end face 35 comes into engagement with the partition face 21C, thus ending the loading operations (i.e., the fifth action).

As a result, the back electrodes 31 of the battery pack 3 come into contact with the pin terminals 22 in the battery chamber 21 so that they become electrically conductive with the pin terminals 22 being pushed down. During the cleaning action, moreover, the sliding motions are kept with the back electrodes 31 of the battery pack 3 and the pin terminals 22 in the battery chamber 21 being in contact with each other. Therefore, the deposits such as dust or tailings having stuck to both of them to cause insufficient insulation can be cleaned/removed to ensure their electric contacts.

Here, the unloading operations to unload the battery pack 3 from the battery chamber 21 can be absolutely reversed from those of the aforementioned case of loading the battery pack 3. As a result, the battery pack 3 can be smoothly taken out without any rattling while being prevented from colliding against the pin-terminals 22 or sliding.

Second Embodiment

Figure 9:
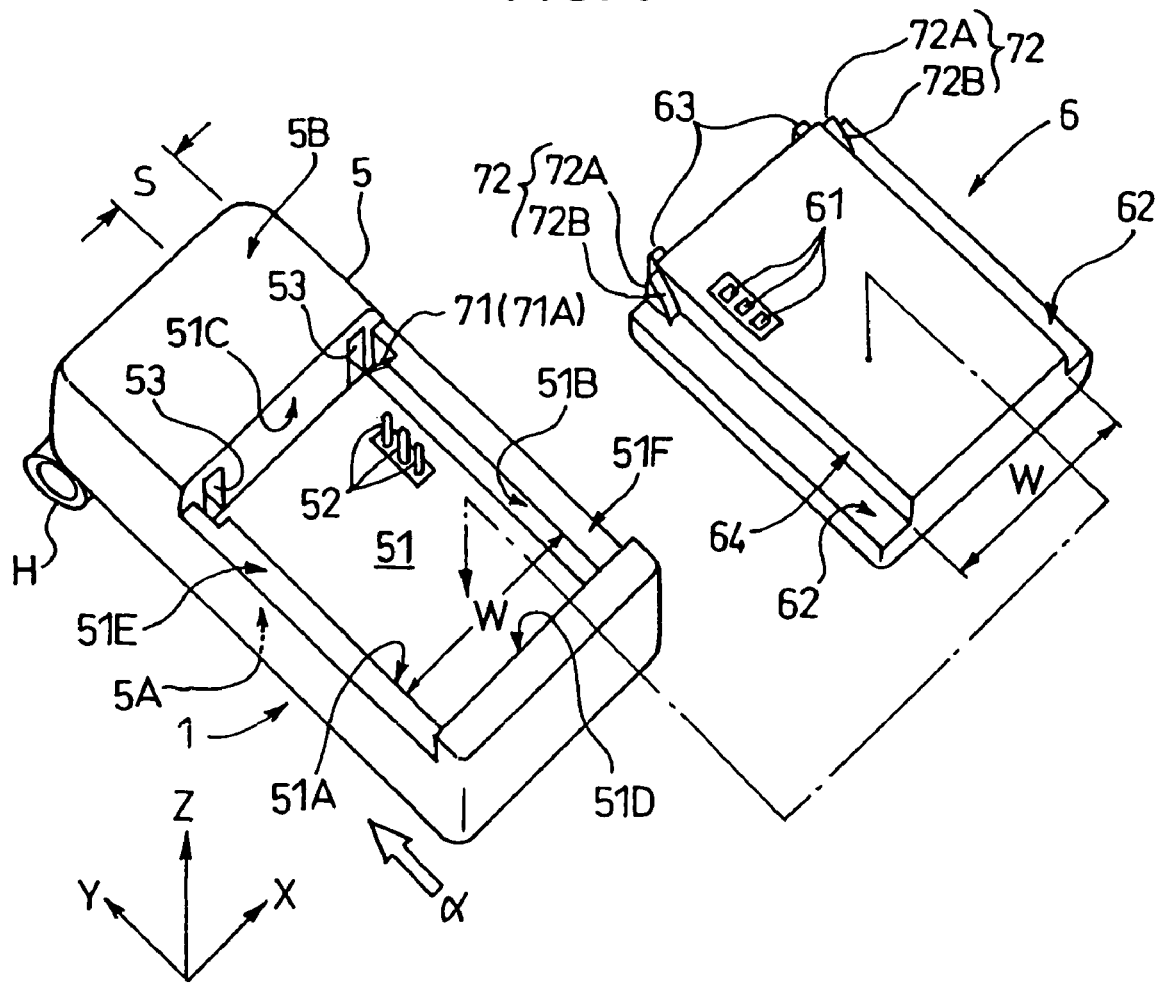
FIG. 9 is a schematic perspective view showing the body of a mobile telephone and a battery pack according to a second embodiment of the invention.

FIG. 9 shows a mobile telephone according to a second embodiment of the invention. This mobile telephone used is of a folding type (or an opening/closing type), and is provided as its major components with the body 1 and a battery pack 6 to be removably mounted in the body 1. These body 1 and battery pack 6 are equipped with collision avoiding mechanisms 7.

The body 1 has its casing portion composed of the not-shown upper casing and a lower casing 5, which are connected to each other at a hinge H.

The lower casing 5 is formed generally into a thin box shape. Especially in this folding type mobile telephone, the lower casing 5 has a wide shape, in which its size in the widthwise (X) direction is larger than the size in the lengthwise (Y) direction perpendicular to the former. The not-shown various operation keys are attached to the surface 5A. On the back 5B of the lower casing 5, on the other hand, there is formed a recessed battery chamber 51, in which the later-described battery pack 6 is removably mounted.

The battery chamber 51 is formed in the lower side of the back of the lower casing 5, i.e., over an about one half or more of the entire back. Especially in this folding type mobile telephone, the battery chamber 51 is also formed into such a wide shape and a generally rectangular shape according to the wide shape of the lower casing 5 that the transverse (X) direction (or the widthwise or shorter direction) is larger than the longitudinal direction (or the longer direction). Like the battery chamber 21 of the first embodiment, this battery chamber 51 is defined on its two left and right sides by lower and longer inner wall faces 51A and 51B (as will be called the "side wall faces") and on its two upper and lower sides perpendicular to the left and right sides by a shorter high inner wall face 51C (as will be called the "partition face") and a shorter low wall face 51D. In that partition face 51C, there are formed the later-described locking holes 53 on the two left and right sides.

Moreover, the battery chamber 51 is provided at the individual side wall faces 51A and 51B with left and right slender frame faces 51E and 51F, which are disposed in parallel while holding the spacing W. The later-described received portions 62 of the battery pack 6 slide and move on the frame faces 51E and 51F.

In this battery chamber 51, moreover, pin terminals 52 for electric contact to the battery pack 6 are disposed in the floor face side of the casing 5.

A plurality of (e.g., ordinary three) pin terminals 52 are arranged in series. In this folding type mobile telephone, the widthwise (X) direction of the lower casing 5 is wider, as described hereinbefore. The battery chamber 51 has a relatively sufficient space in the widthwise direction. By making use of the sufficient space S in this widthwise direction, therefore, the pin terminals 52 are arranged in parallel with the lengthwise (Y) direction perpendicular to the widthwise direction.

In this embodiment, too, the not-shown major electronic parts of the mobile telephone are disposed in the lower casing 5 of the body 1 of the mobile telephone and exclusively on the upper side avoiding the lower side, in which the battery chamber 51 is located. The pin terminals 52 are disposed close to the upper portion of the battery chamber 51 close to the upper portion of the lower casing 5 so that the voltage drop or the like at the time of power feed from the power source can be minimized like the first embodiment.

Moreover, the battery chamber 51 has ascent/descent portion and a push-up portion (as will be called together the "ascent/descent portions 71"), which construct a portion of the collision avoiding mechanism 7 and is protruded generally in a sector shape. These ascent/descent portions 71 are disposed on the side wall faces 51A and 51B near the corner portions to cross the partition face 51C, as shown in FIG. 9. The ascent/descent portion 71 has a curved face 71A (as will be called the "concavely curved face"), which is so recessed in a concave sector shape (in a smoothly arcuate shape) on the face confronting the partition face 51C as to form the ascent/descent portion. This concavely curved face 71A descends the leading end portion, when this battery pack 6 is loaded, smoothly in a mounting (α) direction. The curvature (or the radius of curvature) is suitably determined according to the disposed position of the pin terminals 52, such as the distance from the partition face 51C or the height of the side wall faces 51 A and 51B.

Figure 10:
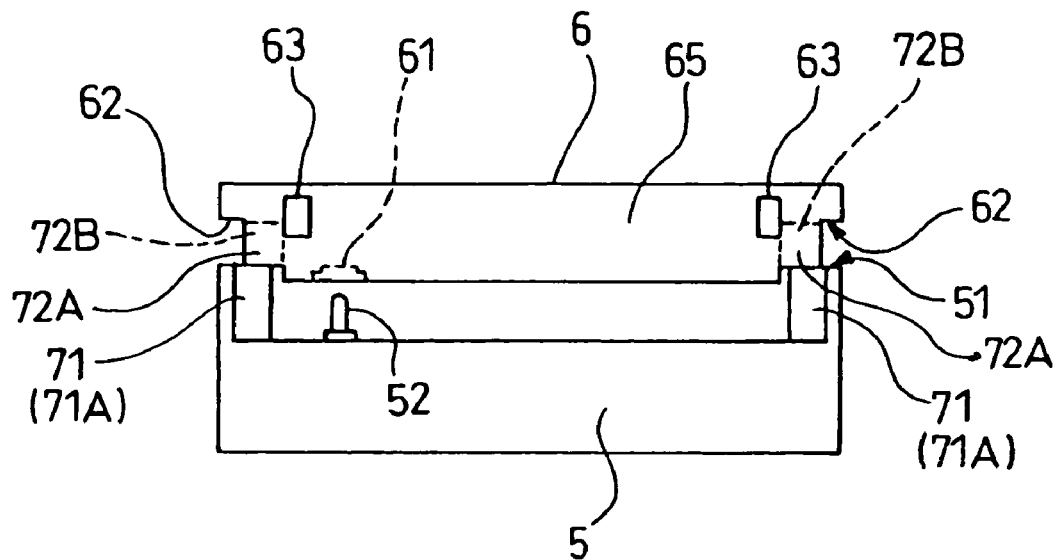
FIG. 10 is an explanatory view showing the state, in which the battery pack rides over pin terminals disposed at the body of the mobile telephone shown in FIG. 9.

On the two left and right side faces of the lower casing 5 leading to the concavely curved face 51A, as shown in FIG. 9 and FIG. 10, there are formed a pair of left and right slender frame faces 51E and 51F (which form the push-up portions, as will be called the "push-up faces"), which are disposed in parallel while holding the spacing W. The later-described received portions 62 of the battery pack 6 slide and move on the frame faces 51E and 51F to ride over the pin terminals 52 thereby to avoid collision against the pin terminals 22.

The battery pack 6 has a body portion formed into a thin box shape. Back electrodes 61 are disposed in the same number and in series on such one end portion close to the side faces of the back of the battery pack 3 as corresponds to the disposed positions of the pin terminals 52 of the battery chamber 51.

Moreover, this battery pack 6 has riding portions 72, which protrude generally in a sector shape to form a part of the collision avoiding mechanism 7. These riding portions 72 protrude from the two left and right sides of that leading end portion of the back of the battery pack 6, which confronts the ascent/descent portions 71. The riding portions 72 smoothly descends on the ascent/descent portions 71 while sliding on the sector-shaped concavely curved faces 71A of the ascent/descent portions 71, thereby to avoid the battery pack 3 reliably from colliding against the pin terminals 22.

Moreover, the riding portions 72 are provided with flat faces 72A (as will be called the "depending faces"), which extend vertically downward from the leading end face 65 (as referred to FIG. 10) of the body portion and which confront the partition face 51C. Moreover, the riding portions 72 are provided, on the side opposed to the depending faces 72A, with convexly curved faces 72B which are curved in a convex sector shape (or in a smoothly arcuate shape). These convexly curved faces 72B are given such a curvature (or a radius of curvature) substantially equal to that of the concavely curved faces 51A, that they may substantially fit on the concavely curved faces 51A of the push-up portions 51 while retaining the later-described cleaning area δ (or the cleaning stroke) (as referred to FIG. 16), when the battery pack 6 is loaded to the last.

Here, this cleaning area δ (or the cleaning stroke) is provided for cleaning and removing the dust or another insulator, which may stick to the back electrodes 31 of the battery pack 3 or the pin terminals 22 of the battery chamber 21 simultaneously as the battery pack 3 is loaded or unloaded. The back electrodes 31 of the battery pack 3 are allowed by that area to contact with/slide to the pin terminals 22 of the battery chamber 21.

As shown in FIG. 9 and FIG. 10, moreover, this battery pack 6 has the received portions 62 of a step shape, which perpendicularly intersect across the spacing W with the widthwise (X) direction in the whole lengthwise (Y) direction on the two transverse side faces. These received portions 62 construct guide means at the time when they are loaded while sliding on the slide faces 51E and 51F of the battery chamber 51.

Here, the lower casing 5 of the body 1 of the mobile telephone and the battery pack 6 are provided with a lock mechanism for preventing the battery pack 6 from floating or coming out after the battery pack 6 was loaded into the battery chamber 51.

Like the first embodiment, specifically, the lower casing 5 of the body 1 has the locking holes 53 in the partition face 51C confronting the battery chamber 51, as shown in FIG. 9, and the battery pack 6 has protruding locking pawls 63 to engage with the locking holes 53, thereby to construct the lock mechanism. Like the first embodiment, when the battery pack 6 is loaded into the battery chamber 51, subsequent to the riding action by the aforementioned collision avoiding mechanism 5, the locking action by the locking mechanism is continuously performed while the battery pack 3 is being slid along the floor face of the battery chamber 21. The locking action after the riding action is performed while the back electrodes 61 of the battery pack 6 are contacting with/sliding on the pin terminals 52 in the battery chamber 51. In other words, the locking action is performed together with the cleaning action.

In this embodiment, too, the pin terminals 52 are provided in the battery chamber 51 as the connecting terminals, but may be the spring terminals (as designated at 103 in FIG. 17) used in the prior art.

The actions of the mobile telephone according to this embodiment are described with reference to FIG. 11 to FIG. 16.

Figure 11:
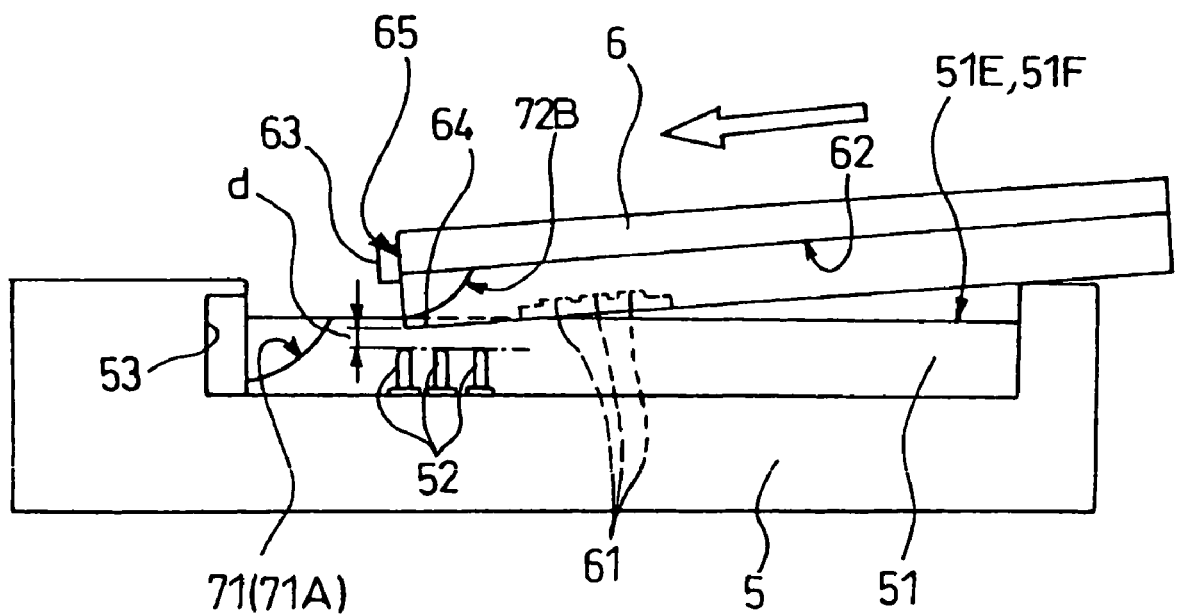
FIG. 11 is an explanatory view showing a first action at the time when the battery pack is loaded into the battery casing of the body of the mobile telephone according to the second embodiment of the invention.
Figure 12:
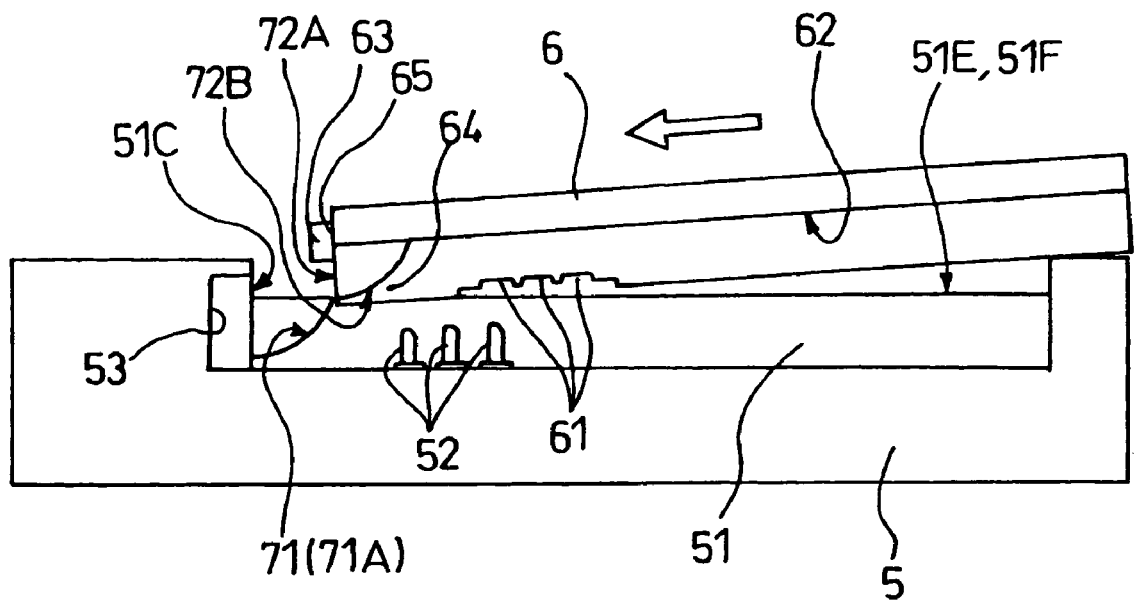
FIG. 12 is an explanatory view showing the final state of the first action shown in FIG. 11.

(1) In case the battery pack 6 is loaded into the battery chamber 51 of the lower casing 5, in the lower casing 5 of the body 1 of the mobile telephone, as shown in FIG. 11, the battery pack 6 is moved in the direction of arrow from its root end portion (as located on the right end portion side in FIG. 9).

As a result, in FIG. 4, while the side walls 64 between the two left and right sides near the riding portions 72 of the battery pack 6 are being clamped by the side wall faces 51A and 51B on the two left and right sides, the battery pack 6 is inserted into the battery chamber 51 and is slid leftward as it is in the inclined state, in which its leading end portion is lower.

Specifically, the battery pack 6 is moved forward (i.e., the first action) toward the partition face 51C, while it is being guided with its side walls 64 being clamped between the side wall faces 51A and 51B and with its convexly curved faces 72B being borne by the slide faces 51E and 51F, till its leading end portion reaches the collision avoiding mechanisms 7.

Thus, the battery pack 6 slides and moves along the slide faces 51E and 51F to the sector-shaped concavely curved faces 71A of the ascent/descent portions 71. As a result, the leading end face 65 of the lower portion of the battery pack 6 can smoothly pass without being retained by the pin terminals 52 of the battery chamber 51 (because a play of a clearance d is provided for protecting the pin terminals 52, as shown in FIG. 11).

Figure 13:
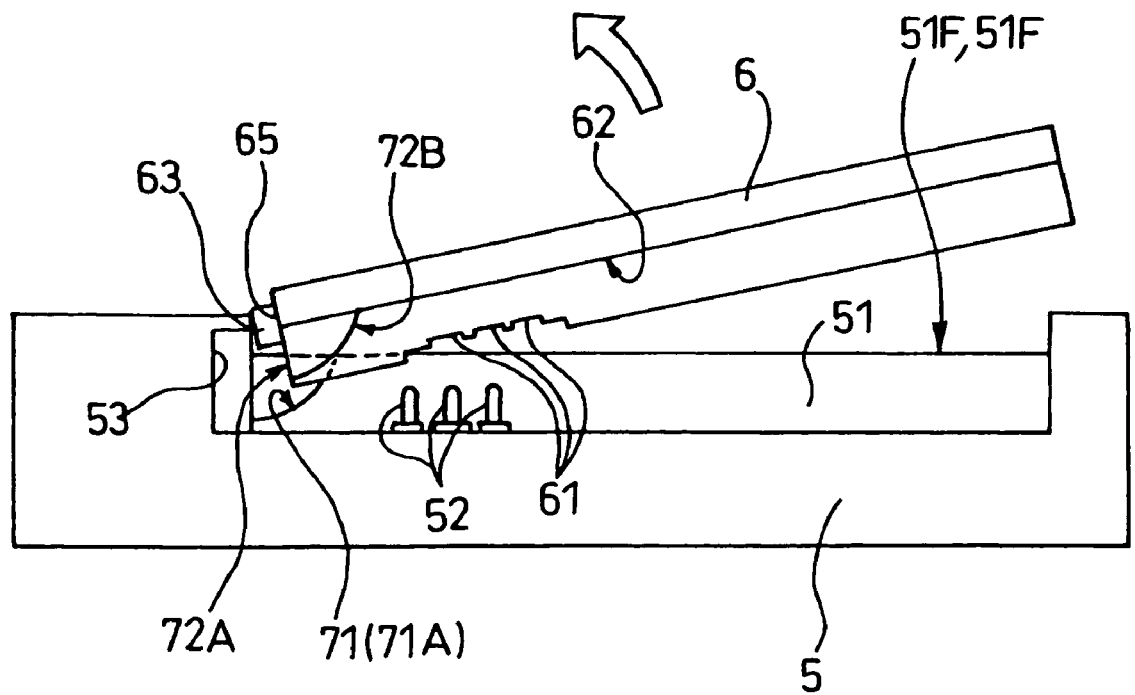
FIG. 13 is also an explanatory view showing a second action at the time when the battery pack is mounted in the battery chamber.

(2) Next, as shown in FIG. 13, the battery pack 6 starts its turning motion so that the convexly curved faces 72B of the riding portions 72 begin to move down along the concavely curved faces 71A (i.e., the second action).

Figure 14:
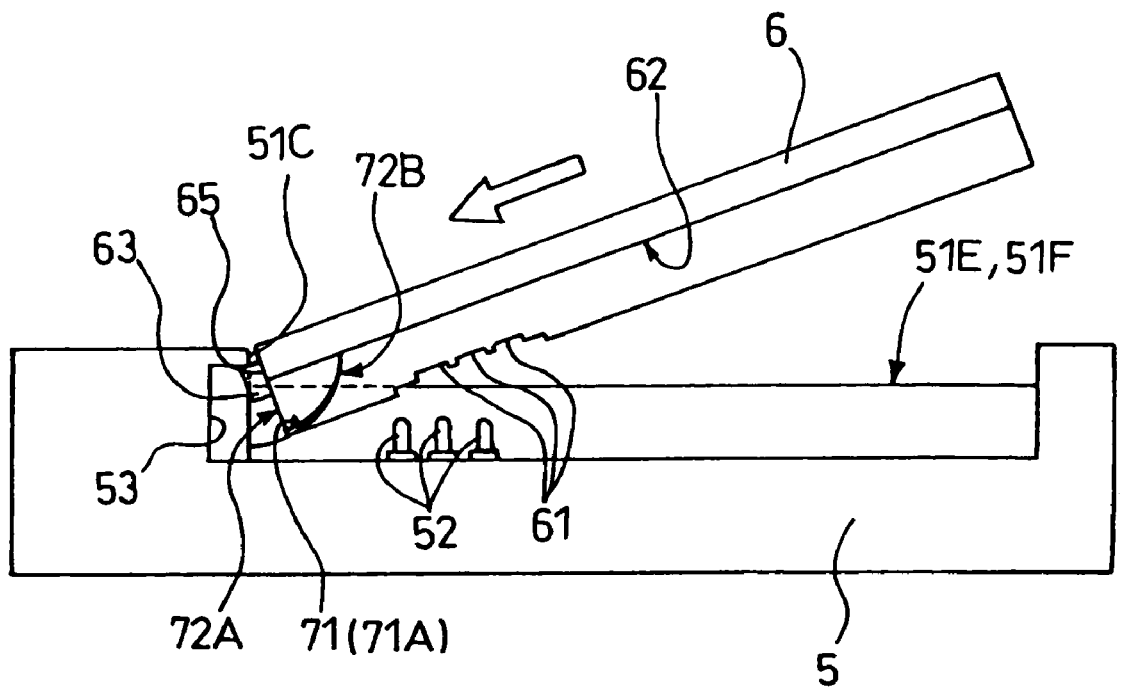
FIG. 14 is also an explanatory view showing a third action at the time when the battery pack is mounted in the battery chamber.

(3) As shown in FIG. 14, the battery pack 6 smoothly moves down with its convexly curved faces 72B of the riding portions 72 following the concavely curved faces 71A, i.e., while drawing turning trajectories, so that the locking pawls 63 at its leading end portion begin to enter the locking holes 53 (i.e., the third action).

Figure 15:
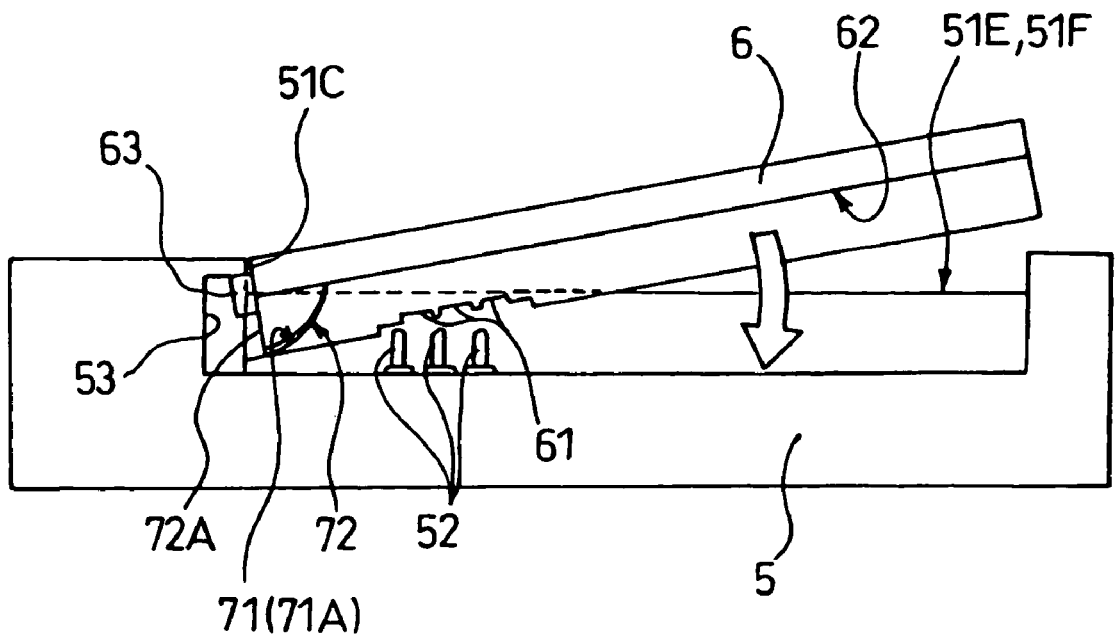
FIG. 15 is also an explanatory view showing a fourth action at the time when the battery pack is mounted in the battery chamber.

(4) After this, as shown in FIG. 15, the battery pack 6 descends with the convexly curved faces 42B of the riding portions 42 drawing the rotary trajectories along the concavely curved faces 41A, so that the locking pawls 63 go deeply into the locking holes 63 (i.e., the fourth action).

Figure 16:
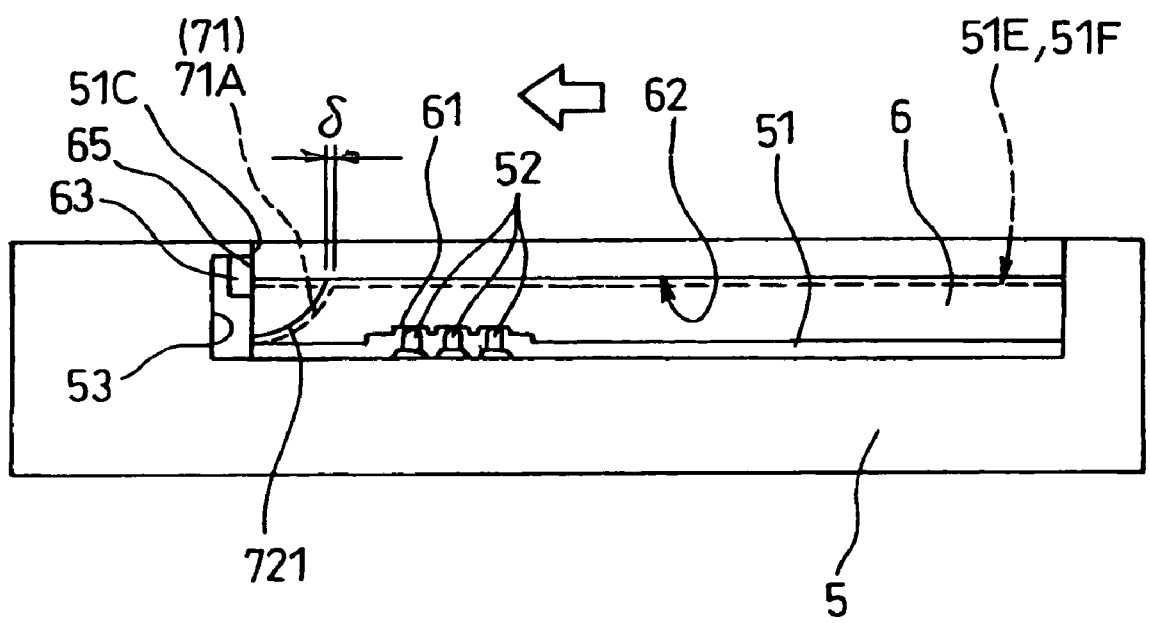
FIG. 16 is also an explanatory view showing a fifth action at the time when the battery pack is mounted in the battery chamber.

(5) Thus, the convexly curved faces 72B of the riding portions 72 fully slide on the concavely curved faces 71A to the last (i.e., to the lowermost position) of the battery chamber 51. Next, as shown in FIG. 16, the received portions 62 of the battery pack 6 slide forward by a constant speed along the push-up faces 51E and 51F thereby to perform the cleaning action. When the battery pack 6 moves forward by the cleaning area δ (or the cleaning stroke), its leading end face 65 comes into engagement with the partition face 51C, thus ending the loading operations (i.e., the fifth action).

As a result, the back electrodes 61 of the battery pack 6 come into contact with the pin terminals 52 in the battery chamber 51 so that they become electrically conductive therewith. During the cleaning action, moreover, the sliding motions are kept with the back electrodes 61 of the battery pack 6 and the pin terminals 52 in the battery chamber 51 being in sliding contact. Therefore, the deposits such as dust or tailings having stuck to both of them to cause insufficient insulation can be cleaned/removed to ensure their electric contacts.

Here, the unloading operations to unload the battery pack 6 from the battery chamber 51 can be absolutely reversed from those of the aforementioned case of loading the battery pack 6. As a result, the battery pack 6 can be smoothly taken out without any rattling while being prevented from colliding against the pin terminals 52 or sliding.

Although the invention has been described in detail in connection with the specific embodiment, it is apparent to those skilled in the art that the invention could be changed and modified in various manners without departing from the spirit and scope thereof.

INDUSTRIAL APPLICABILITY

According to the invention, there is provided a mobile electronic apparatus including: its body having a battery chamber recessed generally in a rectangular shape in the lower portion of a back side of a casing, as opposed to a surface side having an operation unit and a display unit; and a battery pack adapted to be removably housed in the battery chamber formed in the casing back face of the body, characterized by comprising: collision avoiding mechanisms including: generally sector-shaped ascent/descent portions and suitably shaped push-up portions disposed higher than and corresponding to connecting terminals disposed in the battery chamber, on inner wall faces formed on the two sides along the loading direction of the battery pack so as to form the battery chamber and near the corner portions intersecting abutting wall faces perpendicular to the inner wall faces for forming the battery chamber; and riding portions formed on the back face of the battery pack confronting the ascent/descent portions and the push-up portions on the two widthwise sides of the battery pack and ascending/descending while sliding on the sector-shaped faces of the push-up portions thereby to ride over the connecting terminals disposed in the battery chamber. It is possible to smoothen the loading/unloading of the battery pack and to ensure the electric connections between the battery pack and the mobile electronic apparatus body.

According to the invention, moreover, an area for a cleaning action to clean the outer faces of the connecting terminals or back electrodes disposed in the battery pack is retained between the ascent/descent portions of the casing on the body side of the mobile electronic apparatus and the riding portions of the battery pack at the time when the battery pack is loaded into the mobile electronic apparatus.

At each loading/unloading time of the battery pack, the connecting terminals and the electrodes can be cleaned in association with the loading/unloading operation. As a result, the electric contact failure can be prevented even for a long-term use or under a dusty environment.

The invention claimed is:

1. A mobile electronic apparatus comprising:

a main body having a battery chamber recessed generally in a rectangular shape in a lower portion of a back side of a casing, as opposed to a surface side having an operation unit and a display unit;

a battery pack adapted to be removably contained in the battery chamber formed at a back face of the casing of the main body; and a collision avoiding unit including:

protrusions into the battery chamber from the main body having generally sector-shaped and concavely curved ascent/descent portions formed into substantially concavely arcuate faces oriented toward the loading direction of the battery pack and suitably sector-shaped and convexly curved push-up portions formed into substantially convexly arcuate faces oriented toward the unloading direction of the battery pack, on inner wall faces formed on the two sides along the loading direction of the battery pack so as to form the battery chamber and near a corner portion intersecting an abutting wall face perpendicular to the inner wall faces for forming the battery chamber, wherein said protrusions into the battery chamber from the main body are disposed higher than and corresponding to a connecting terminal disposed in the battery chamber; and riding portions which are protruded from the battery pack generally in a sector shape and are formed on a back face of the battery pack confronting the ascent/descent portions and the push-up portions on the two widthwise sides of the battery pack and ascending/descending while sliding on the sector-shaped faces of the push-up portions so as to ride over the connecting terminal disposed in the battery chamber, wherein the riding portions of the battery pack are formed into substantially convexly arcuate faces oriented toward the unloading direction of the battery pack.

2. A mobile electronic apparatus comprising:

a main body having a battery chamber recessed generally in a rectangular shape in a lower portion of a back side of a casing, as opposed to a surface side having an operation unit and a display unit;

a battery pack adapted to be removably contained in the battery chamber formed at a back face of the casing of the main body; and a collision avoiding unit including:

protrusions into the battery chamber from the main body having generally sector-shaped ascent/descent portions and suitably shaped and curved push-up portions on inner wall faces formed on the two sides along the loading direction of the battery pack so as to form the battery chamber and near a corner portion intersecting an abutting wall face perpendicular to the inner wall faces for forming the battery chamber, wherein said protrusions into the battery chamber from the main body are disposed higher than and corresponding to a connecting terminal disposed in the battery chamber; and riding portions which are protruded from the battery pack generally in a sector share and are formed on a back face of the battery pack confronting the ascent/descent portions and the push-up portions on the two widthwise sides of the battery oack and ascending/descending while sliding on the sectorshaped faces of the push-up portions so as to ride over the connecting terminal disposed in the battery chamber, wherein the mobile electronic apparatus is a folding type mobile telephone having main body side casing portions connected to each other through a hinge;

wherein the collision avoiding unit is constructed that the ascent/descent portions disposed on the main body side lower casing of the mobile telephone are formed into generally convexly arcuate faces oriented toward the loading direction of the battery pack;

wherein the collision avoiding unit is constructed that the riding portions of the battery pack are formed into generally concavely arcuate faces oriented in the direction to unload the battery pack; and wherein the collision avoiding unit is constructed that a plurality of the connecting terminals are arranged along the longer direction of the main body side casing, and a plurality of back electrodes are arranged on a back face of the battery pack so as to correspond to the connecting terminals for connecting to the connecting terminals of the battery chamber.

3. A mobile electronic apparatus comprising:

a main body having a battery chamber recessed generally in a rectangular shape in a lower portion of a back side of a casing, as opposed to a surface side having an operation unit and a display unit;

a battery pack adapted to be removably contained in the battery chamber formed at a back face of the casing of the main body; and a collision avoiding unit including:

generally sector-shaped ascent/descent portions and suitably shaped push-up portions which are disposed higher than and corresponding to a connecting terminal disposed in the battery chamber, on inner wall faces formed on the two sides along the loading direction of the battery pack so as to form the battery chamber and near a corner portion intersecting an abutting wall face perpendicular to the inner wall faces for forming the battery chamber; and riding portions which are formed on a back face of the battery pack confronting the ascent/descent portions and the push-up portions on the two widthwise sides of the battery pack and ascending/descending while sliding on the sector-shaped faces of the pushup portions so as to ride over the connecting terminal disposed in the battery chamber, wherein an area for a cleaning operation to clean outer face of the connecting terminal or a back electrode disposed in the battery pack is set between the ascent/descent portions of the casing on a main body side of the mobile electronic apparatus and the riding portions of the battery pack at the time when the battery pack is loaded into the mobile electronic apparatus.

4. The mobile electronic apparatus as set forth in claim 1, wherein a plurality of the connecting terminals in the battery chamber are made of pin terminals protruded vertically upward from a floor face of the battery chamber, and are biased with an elastic force to freely move in a vertically upward direction.

5. The mobile electronic apparatus as set forth in claim 1, wherein the mobile electronic apparatus is a mobile telephone having a rod-shaped the main body side casing; and wherein the collision avoiding unit is constructed that a plurality of the connecting terminals are arranged along a shorter direction of the main body side casing, and a plurality of back electrodes are arranged on a back face of the battery pack so as to correspond to the connecting terminals for connecting to the connecting terminals of the battery chamber.

* * * * *